Figure 1:
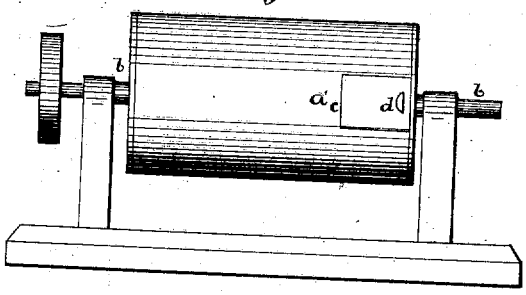

J. R. ALSING.

APPARATUS FOR PULVERIZING PORCELAIN PASTE.

No. 10,382. Reissued Sept. 18, 1883.

WITNESSES:

W. P. Robertson

R. Robertson

INVENTOR

BY Johan Robert Alsing

T. J. W. Robertson.

ATTORNEY.

UNITED STATES PATENT OFFICE.

JOHAN R. ALSING, OF HOBOKEN, NEW JERSEY.

APPARATUS FOR PULVERIZING PORCELAIN-PASTE.

SPECIFICATION forming part of Reissued Letters Patent No. 10,382, dated September 18, 1883.

Original No. 99,128, dated January 25, 1870. Application for reissue filed May 6, 1879

*To all whom it may concern:*

Be it known that I, JOHAN ROBERT ALSING, formerly of Stockholm, in the Kingdom of Sweden, and residing in Hoboken, in the county of Hudson and State of New Jersey, have invented a new and useful Improvement in Apparatus for Pulverizing Porcelain-Paste, of which the following is a specification.

My invention relates to machinery for reducing various granulated substances to an impalpable powder for use in the manufacture of porcelain.

Previous to my invention porcelain-paste was made by submitting the material to the action of water and heavy traveling stones sliding in a circular trough.

The object of my invention is to provide an improved apparatus whereby porcelain material, without injury to the product, may be reduced to requisite fineness, in a dry state, more rapidly and economically than by the old method.

The invention consists in the combination, construction, and arrangement of parts hereinafter described and claimed.

The operation is as follows: The substances are granulated, and then introduced in the porcelain-lined cylinder or drum to such an extent as to fill about one-fourth of its capacity, and with them porcelain or glass balls to the extent of another fourth part of the capacity of the cylinder. This latter is then made to revolve, at a speed of about thirty to thirty-five revolutions a minute, during from four to five hours. The substances will by this means have been reduced to an impalpable powder, which may then at once be employed without further preparation.

The drum is provided with one or more openings, through which the materials and balls are introduced. When the former have been reduced to a powder of the requisite fineness, the covers are removed and replaced by gratings with apertures sufficiently small to prevent the balls from passing through. The drum is then caused to revolve again, whereby the pulverized materials will be made to pass out through the gratings into a receptacle below.

I have ascertained by repeated and expensive experiments that neither wood nor metal is a practical working-surface for the cylinders, as the former does not sufficiently withstand the wear, and, besides, takes fire from the heat produced by the friction of the triturating-balls. The latter always causes stains and discolorations upon the porcelain articles when baked. Experiments with iron cylinders have proved that, although the powder may be ground impalpable in the best polished cylinder, and, when triturated, will show no sign of injury, any article made of such powder will, when baked, exhibit numerous dark rust-stains, (or other oxide, as the case may be,) completely spoiling the goods for the market. Even the screws or nails in a wooden cylinder produce the same effect if in contact with the material to be triturated for porcelain-paste. Therefore, before my present invention, triturating drums or cylinders were entirely impractical for use in the manufacture of porcelain.

On the accompanying sheet of drawings is shown the before-described improved apparatus.

Figure 2:
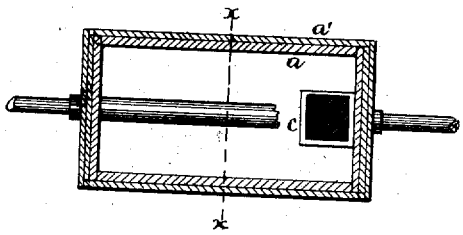
Figure 3:
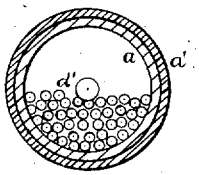

Figure 1 is a side view of my triturating cylinder; Fig. 2, a longitudinal section of the same; Fig. 3, a transverse vertical section of the same, taken in the line *x x*, Fig. 2.

Similar letters of reference indicate corresponding parts in the several figures.

*a* is the porcelain-cylinder, which may, if desirable, be inclosed in a wooden jacket or outer cylinder, *a'*. This cylinder revolves on central gudgeons, *b b*, supported in bearings by a suitable frame-work.

*c* is an opening in the cylinder and jacket, near or at one end of the same, which is closed by means of a cover, *d*. Through this opening the material to be pulverized and the triturating-balls *d' d'* are introduced. After the pulverization of the materials has been effected, the cover *d* is removed and a grating, *e*, adjusted in its place, so as to cover the opening *c*. (See Fig. 2.) This allows the pulverized materials to pass through it, but retains the balls. The rotation of the cylinder is continued during about ten or fifteen minutes, during which time the powder falls into a receptacle placed below.

Having thus described my invention, I claim as new and desire to secure by Letters Patent—

The combination, with a cylinder having a porcelain lining, and provided with an opening, *c*, and a cover, *d*, of the grating *e* and balls *d'*, substantially as described.

Witnesses: JOHAN ROBERT ALSING.

A. W. ALMQVIST,

SIGFRID LINDHAGEN.